Oct. 14, 1969  A. J. ADORNETTO ET AL  3,473,079
CONTINUOUS WAVEFORM PRESENTATIONS IN
TIME-SHARED SYSTEMS
Filed April 25, 1968  5 Sheets-Sheet 1
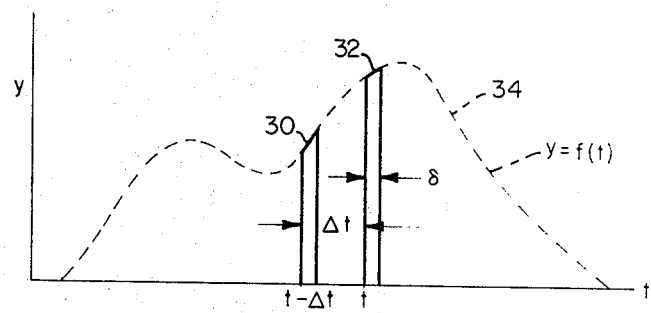
FIG_1
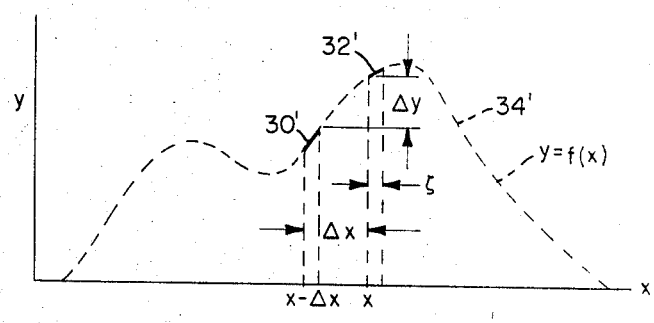
FIG_2
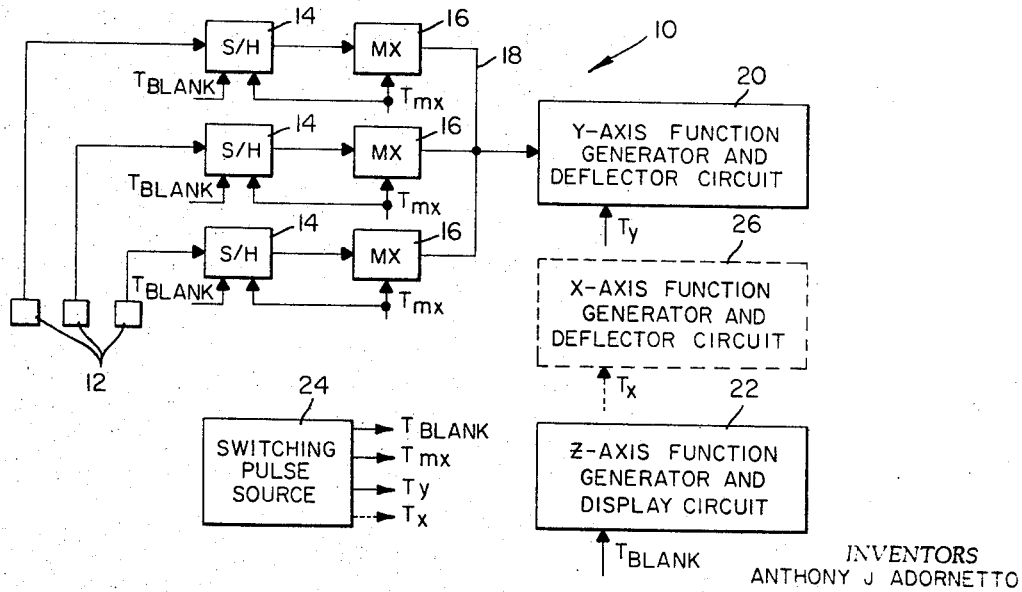
FIG_3
INVENTORS
ANTHONY J ADORNETTO
LESLIE L. FOX
BY
Robert H. Clay
ATTORNEY

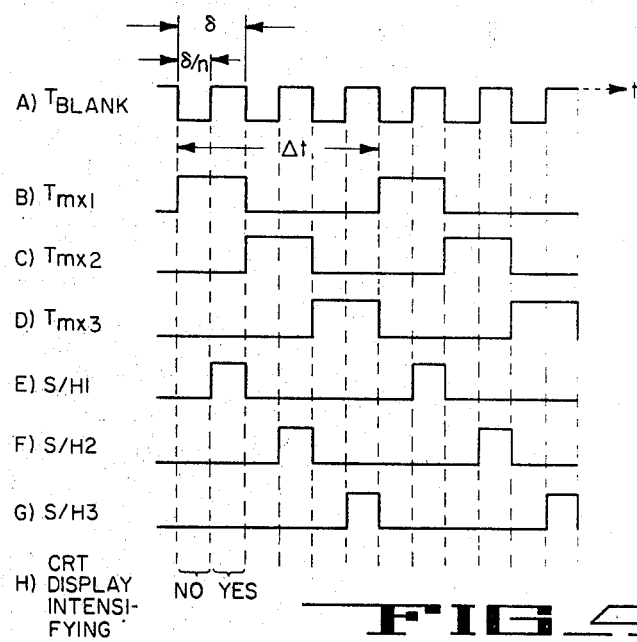
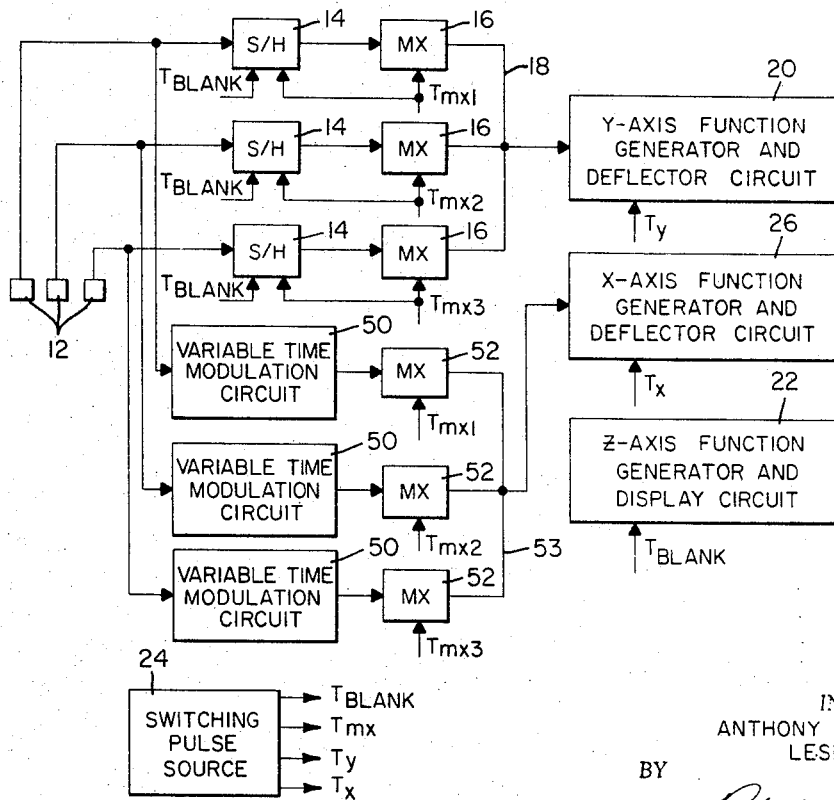

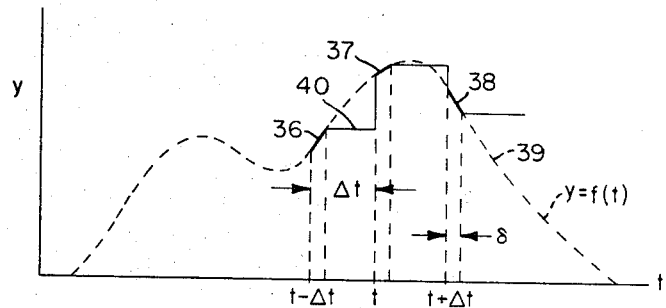
FIG_6
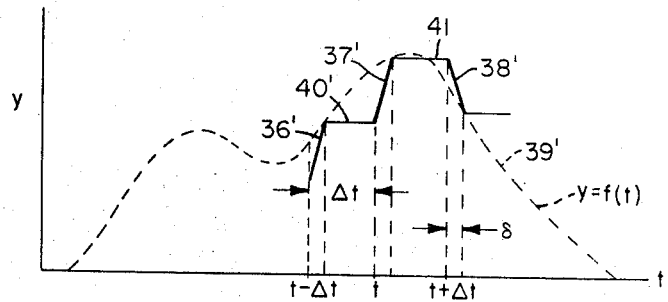
FIG_7
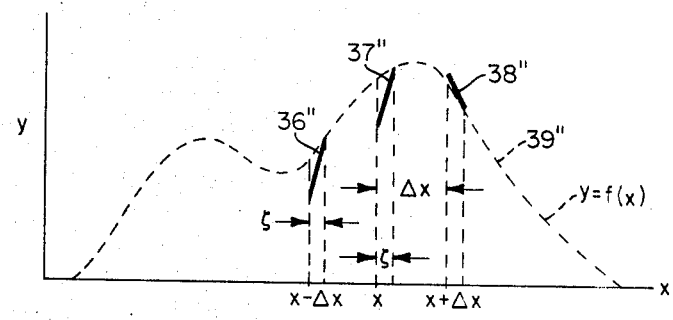
FIG_8

FIG_9A 
FIG_9B 
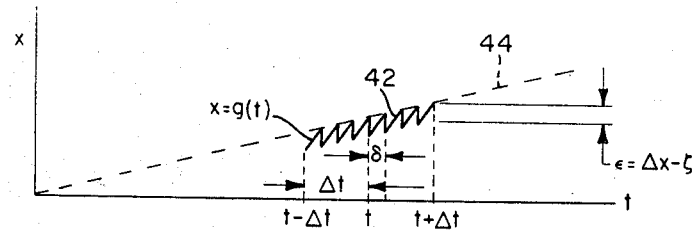
FIG_10
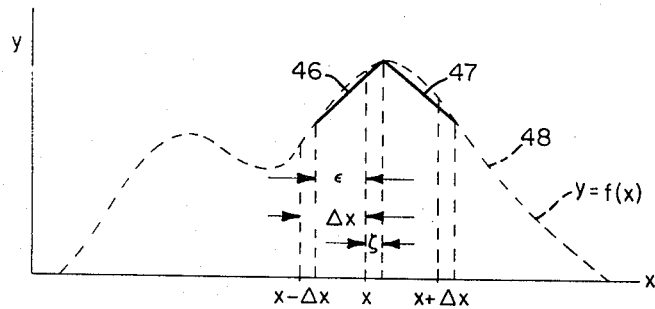
FIG_11

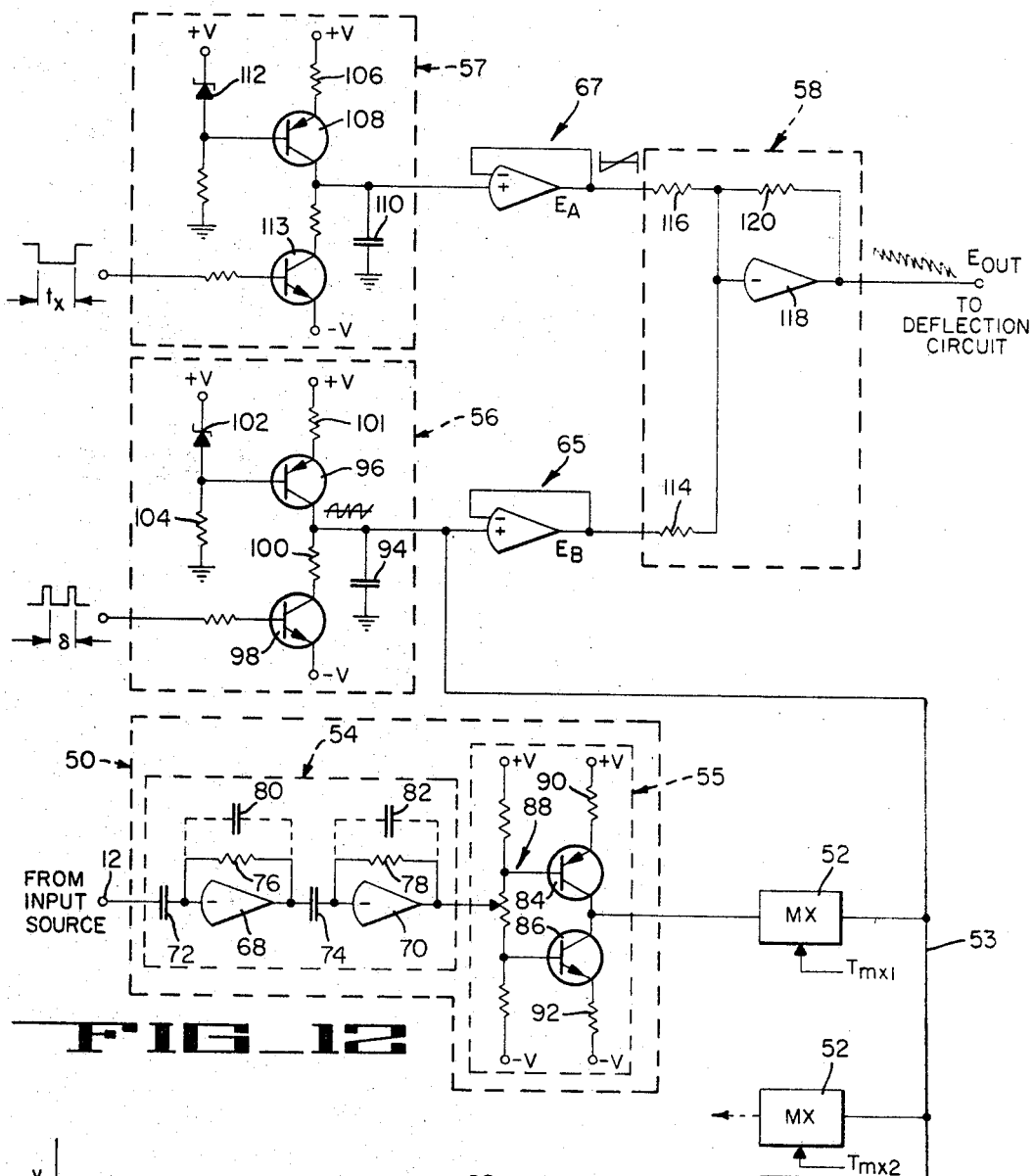
FIG_12
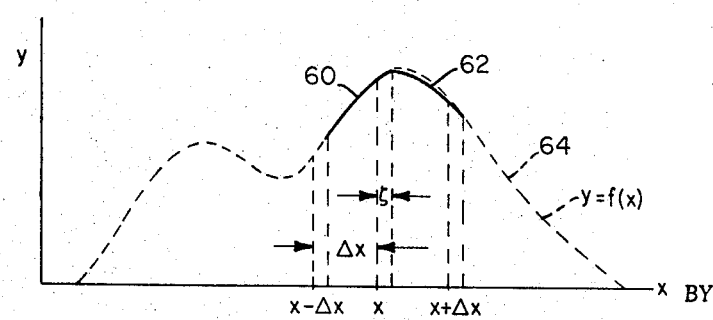
FIG_13
INVENTORS
ANTHONY J. ADORNETTO
LESLIE L. FOX
*Robert S. Clay*
ATTORNEY

United States Patent Office 3,473,079
Patented Oct. 14, 1969

3,473,079
CONTINUOUS WAVEFORM PRESENTATIONS IN TIME-SHARED SYSTEMS
Anthony J. Adornetto and Leslie L. Fox, Houston, Tex., assignors to Mandrel Industries, Inc., Houston, Tex., a corporation of Michigan
Filed Apr. 25, 1968, Ser. No. 724,100
Int. Cl. H01j 29/70
U.S. Cl. 315—22                 9 Claims

ABSTRACT OF THE DISCLOSURE

Apparatus for plotting original waveforms that have been time-shared, by reconstructing them in segments formed by function generators, whose functions are determined by the information present at their input at a given time. The basic embodiment utilizes a sample and hold circuit to selectively sample and hold incoming analog data in a respective channel, and a multiplexer circuit which receives the sampled data and subsequently selectively introduces same to a y-axis sweep circuit of a cathode ray tube display device. The vertical excursions, i.e., $\Delta y$ gaps, are generally filled in due to the action of the sample and hold, and the multiplexer circuits, to provide a substantially continuous curve and thus a relatively detailed curve presentation.

More sophisticated embodiments of the invention include a function generator for providing a sawtooth waveform, which is used to modulate the x-axis function generator output. This provides a circuit which eliminates the ($\Delta x$) gaps between samples in the horizontal direction, thereby providing an even more precise waveform presentation. In still a further embodiment the slope of the input seismic signal waveform is sensed by a variable time modulation circuit, and the segments which are displayed on the cathode ray tube to define the displayed curves are bent in accordance with the slope sensed. The bent segments match rather closely the theoretical curve of the seismic signal along even the more curved portions thereof.

BACKGROUND OF THE INVENTION

Previous time-shared waveform displays produce waveforms which are not only discontinuous, but are represented by separate, individually sampled dots taken along the input signal waveforms. To cause the resulting, displayed dots to run together and thus present a more continuous and readable curve, the sampling rate may be increased to decrease the distance between sample times along the input signal waveform, i.e., to decrease the $\Delta x$ gap. In addition, a more continuous looking curve may be obtained by smearing the sampled dots into one another. For example, if the waveform were to be presented on the face of the cathode ray tube (hereinafter abbreviated as CRT), or into an area of film which passes the CRT face, the smearing could be enchanced by increasing the dot size of the display, the de-focus of the CRT, the splatter on the phosphor and/or the splatter on the film. The dots which define the curve then appear to run together for small amplitude changes or excursions of the curve. That is, the thickness of the dots appear larger than they really are and would join or overlap each other as each sampled dot of the input signal waveform is displayed. However, for large excursions of the curve in the y-axis direction, $\Delta y$ (the vertical distance between successive dots) is much larger than $\Delta x$ (the horizontal distance between dots) and the spaces between sampled dots will therefore still be apparent resulting in a curve presentation which is discontinuous and difficult to read. Increasing the dot size also has the disadvantage of decreasing the resolution of the display.

It may be seen that simply increasing the thickness or smear of a displayed dot does not increase the accuracy with which the waveform is presented, but rather tends to average or mask the curve excursions. Raising the sample rate to decrease the distance between dots improves the continuity and detail of the curve presentation, but there is a limit as to how high the sample rate can be raised. This limit is due generally to the fact that various circuits in the display system exhibit an integrating effect. This tends to slow and delay all voltage changes. This effect is particularly noticeable in the deflection amplifier used to control and direct the electron beam of the CRT. Thus in prior art systems, this integrating effect hinders the presentation of a relatively continuous curve display and the effect is overcome by utilizing relatively complex, bulky, and more expensive circuits such as for example, low inductance yokes, high current deflection amplifiers and fast multiplexers.

In typical prior art systems, the plurality of incoming seismic signals are fed to a multiplexer and thence to a y-axis sweep circuit of a CRT, whereby the y-axis deflections of the curve are obtained. The x-axis deflections are represented as time which is defined by making the output of an x-axis function generator linear with respect to time for the period of the complete record. The linear function may be obtained by providing a ramp generator with a period equal to the length of the recording, wherein this signal is sent to the x-axis of the CRT deflection circuitry, leaving the film stationary. On the other hand, the linear function may be provided by omitting the x-axis function generator and moving the film with respect to the CRT with linear velocity in the x-axis direction.

It follows therefore that it is preferable to display the sampled values of the input signal waveform in such manner that they in essence "run together" without having to smear the sampled values, or having to radically increase the sampling rate, in order to give the displayed curve the appearance of a continuous line rather than a spaced series of dots.

SUMMARY OF THE INVENTION

The invention provides apparatus which improves the quality of a curve display, wherein the input seismic signals are first fed via respective channels into relatively slow, and thus relatively inexpensive, sample and hold circuits, and thence into multiplexer circuits. The invention in essence utilizes to good advantage the undesirable integrating effect generally found in prior art systems. That is, improved curve definition could be obtained by adding an integrator in the y-axis deflection circuitry in order to write the line in between the samples beginning at $x-\Delta x$ and $x$, as is further described in detail infra. However, the invention obtains the same effect by using a slow sample and hold circuit. Thus there is no need for a faster, and more expensive, beam deflection system because the use of the "slow" sample and hold circuit provides the additional integration called for to write the line in accordance with the invention.

The multiplexer outputs are fed to a y-axis function generator which in essence forms a part of the y-axis deflection circuitry of a CRT. The invention circuit displays a line or segment rather than a dot for each of the samples taken along the incoming seismic signal. To this end, the sample and hold circuit holds the value of a previous sample and at such time as the tube is on, the multiplexer samples the succeeding sample, whereby the value of the previous sample changes to the value of the succeeding sample. Since the tube is on during this change of value, the movement of the beam from the first position to a second position (the positions being indicative of the sampled values) causes the tube to display a line or segment which starts at the value of the first sample and ends at the value of the second sample.

Accordingly, in its basic form, the invention provides a sample and hold circuit disposed between the conventional multiplexer circuitry and the incoming seismic signal sources to hold a previously sampled signal value and then allow the beam to travel to the next sampled value during the time the CRT is turned on, causing the display to resemble a succession of vertical line segments rather than a succession of dots. The $x$ and $z$-axis function generators may be operated as in prior art devices, as a linear function relative to time (hereinafter termed a ramp function), and a function which is independent of the input, respectively.

In an alternative embodiment of the invention the $x$-axis function generator is modulated to provide a sawtooth waveform which is added to the ramp function. Thus for modest sample rates, the input signal waveform is sampled, reconstructed, and still can be recognized since the gaps ($\Delta x$ and $\Delta y$) between the displayed segments in the $x$ and $y$-axis directions are substantially eliminated.

In still another embodiment, the sawtooth modulated $x$-axis function is further modified to provide a decreasing sawtooth slope for positive second derivatives of the input signal, $f(t)$, increasing slope for negative second derivatives of $f(t)$, and linear slope where $f(t)$ has a zero second derivative.

BRIEF DESCRIPTION OF THE DRAWINGS

FIGURES 1 and 2 are graphs showing the sampled waveform and the displayed waveform respectively for any given channel of prior art systems, wherein the dashed line represents the input seismic signal waveform, and the smeared dots show the displayed samples for a selected sample time $\delta$. FIGURE 1 is the output on the mentioned channel as seen at the multiplexer buss if all other channels are held to zero input.

FIGURES 3 and 5 are simplified block diagrams depicting various embodiments of the invention.

FIGURE 4A–H is a graph of a series of waveforms showing the timing relationships between the various circuits for a system with three channels.

FIGURES 6 and 7 are graphs showing the waveform generated at various points along the circuit of FIGURE 3 for any given channel.

FIGURE 8 is a graph showing the display obtained by the invention of FIGURE 3 for any given channel.

FIGURE 9A–B is a graph comparing the resulting waveform display of a prior art display system and of the inventive system respectively.

FIGURES 10 and 11 are graphs showing respectively the modulation of the $x$-axis linear ramp function, and the resultant display, using the alternative embodiment discussed in conjunction with FIGURE 3.

FIGURE 12 is a schematic diagram exemplifying by way of example only various circuits which may be utilized in the alternative embodiment depicted in FIGURE 5.

FIGURE 13 is a graph showing the display obtained by the invention of FIGURE 5 using the various circuits of FIGURE 12.

DESCRIPTION OF THE PREFERRED EMBODIMENTS

Regarding first the prior art systems and referring to FIGURES 1 and 2, there are shown similar curves 34, 34' wherein curve 34 is the incoming seismic signal for a given channel and curve 34' is the (theoretical) seismic signal as displayed on the face of a CRT or on a recording medium passed by the face of the CRT. The curve 34 is fed to a conventional multiplexer which is timed to sample at times $t$ and $t-\Delta t$ and other times $\Delta t$ apart, to provide samples 32 and 30 and other samples $\Delta t$ apart respectively, which are then fed to the $y$-axis deflection system of the display device. The samples 30, 32, etc., are each taken for a sample time $\delta$ and since the curve 34 represents only a single channel of information, the samples repeat at a sample period $\Delta t$.

Note that although the figures show $\delta$ large with respect to $\Delta t$ for clarity of presentation only, $\delta$ is generally small compared to $\Delta t$ wherein the maximum ratio is $\delta/\Delta t = 1/N$ where N is the number of channels to be time-shared, $\delta$ is the sample time and $\Delta t$ is the sample period. The samples 32, 30 are displayed on the face of the CRT and would appear accordingly as smeared dots 32', 30' of FIGURE 2, having a duration proportional to the sample time $\delta$ at horizontal positions $x$ and $x-\Delta x$ respectively. The smeared dots 30', 32' appear on the display at spaced apart intervals equal to $\Delta x$ which is proportional to the sample period $\Delta t$, which in turn, is proportional to the number of channels that are being sampled and thus displayed on the tube. That is, the greater the number of channels, the greater the distance $\Delta x$ between the samples taken and shown in the display since each channel is sampled consecutively. In order to give the appearance of a smooth line, the samples must be displayed so that they are smeared into one another. For example, if the waveform 34' were to be presented by a CRT onto an area of film, the combination of the dot size of the display, the focus of the CRT, the splatter on the phosphor, the splatter on the film, and other conditions would cause the smearing mentioned above. This would cause the $\zeta$'s to appear larger and the $\Delta y$'s to appear smaller than they really are. Indeed the $\zeta$'s may cover the whole of the $\Delta x$ space between samples. The dots 30', 32' would be run together for small changes in amplitude; that is, all the $\Delta y$'s would appear smaller than they really are and would join and even overlap each other. However, for large amplitude ($y$-axis) excursions, $\Delta y$ shown in FIGURE 2 is much larger than $\Delta x$ and will therefore still be apparent, resulting in a discontinuous curve presentation having a lack of detail.

Referring now to FIGURE 3, a basic embodiment 10 of the invention includes a plurality of input sources 12, geophones, magnetic tape, etc., disposed to receive incoming seismic information in the form of input waveforms reflected from underground formations, and a plurality of sample and hold circuits 14 coupled to respective input sources 12. In actual practice, these input sources are not connected directly to the sample and hold circuits 14, but are modified first, i.e., amplified and sometimes mixed, in generally conventional fashion. A like plurality of multiplexers 16 are coupled to respective sample and hold circuits 14 and the outputs therefrom are connected together as at a multiplexer output buss 18. A $y$-axis function generator and deflection circuit 20 is coupled to the buss 18 and provides the electron deflection portion of, for example, a cathode ray tube (CRT) display device (not shown), such as conventionally employed in geophysical display systems. That is, the CRT may be an electrostatic or a magnetic type of tube with corresponding electrostatic plates or magnetic yoke respectively. A $z$-axis function generator and display circuit 22 is coupled at its output to the blanking circuitry (not shown) of the CRT and provides means for blanking or unblanking the tube to allow the beam to selectively mask or display the seismic information being sampled by the sample and hold and the multiplexer circuits. An $x$-axis function generator and deflection circuit 26 is depicted in FIGURE 3 in phantom line, since the function of circuit 26 can be provided either by moving a recording medium past the face of the CRT in a $x$-axis direction, or by providing a ramp or staircase generating circuit which moves the beam in an $x$-axis direction for the duration of each record.

The various circuits of FIGURE 3 are provided with respective switching inputs which synchronize the operation thereof. Thus, the sample and hold circuits 14 each have switching inputs $T_{blank}$ and $T_{mx}$, the multiplexers 16 have switching inputs $T_{mx}$, the $y$-axis circuit 20 has a switching input T_y, and the z-axis circuit 22 has a switching input T_blank. The switching inputs are provided by a timing pulse generating source 24 of the type conventionally used to switch the multiplexers and x, y, and z-axis circuits of prior art display apparatus, and accordingly are not further described herein.

Referring to FIGURES 3 and 4, the basic embodiment of the invention provides means for eliminating the vertical gaps between samples to thus improve the detail of the curve presentation. In the more sophisticated circuit of FIGURE 5, the invention, in addition, provides means for eliminating the gaps between samples in the x-axis direction to thus provide even a more exact curve presentation. Accordingly a seismic signal, e.g., curve 34 of FIGURE 1, is introduced to each of the channels of the sample and hold circuit 14 via respective input sources 12. A switching input T_mx is introduced to the multiplexers 16 as well as to the sample and hold circuits 14, wherein accordingly the multiplexers act as switches to allow sequential sampling of the channels of incoming seismic signals at periodic intervals, each sample being taken for a sample time δ. As shown in FIGURE 4B–D the multiplexer 16 of each channel is sequentially triggered to allow consecutive sampling of the seismic signals in each channel, which signals are then fed via the buss 18 to the y-axis function generator and deflection circuit 20.

When switching from one channel to another, transients and integrating effects are experienced during the first portion of the sample time δ, and accordingly switching inputs T_blank are provided to the sample and hold circuits 14 of each channel. Internal to the sample and hold circuits 14 of each channel are conventional AND gates. The ANDed result of T_blank and T_mx are shown in FIGURE 4E, F and G. The T_blank switching input is also provided to the z-axis function generator and display circuit 22 whereby the tube is turned off for a first portion (e.g., ½) of the sample time δ, to thus mask the transient portion of the sampled signal.

Accordingly, referring to FIGURES 6, 7 and 8, in accordance with the invention, if consecutive samples 36, 37, and 38 are taken along an incoming seismic signal (curve 39) for any given channel, the value of the sample 36 is "remembered" by the sample and hold circuit 14 until the subsequent sample 37 is taken a sampled period Δt later; see numeral 40 of FIGURE 6. It is to be noted that the length of the samples 36, 37 and 38 are in actual practice, each a dot having a single value. At that time, the T_blank switching input turns on the CRT in synchronism with the switching input T_mx sent to the multiplexer 16 and sample and hold circuit 14, whereby the value seen by the multiplexer 16 moves to that of the subsequent sample 37. However, since the CRT has been turned on by the z-axis circuit 22 via the switching input T_blank, as the beam moves to the new value of sample 37, a line or segment rather than a dot is drawn between the values of the two samples. Thus, the sample 37 is shown as a segment 37' in FIGURE 8, which extends from the sampled value of sample 36 to the sampled value of sample 37 shown in FIGURE 6. Thus, the circuit is actually drawing the entire curve in the y-axis direction, as is shown in FIGURE 8. The sample segments 36'', 37'', and 38'' of FIGURE 8 are displaced from one another in the x-axis direction by a value of $x-\Delta x+\zeta$. However, in an actual display presentation as recorded on a medium, the sampling rate is relatively rapid and the interval $x-\Delta x+\zeta$ is actually very small. Thus the adjacent ends of the sample segments 36'', 37'' and 38'' as actually displayed on the CRT (FIGURE 8) appear to be very close together, drawing essentially a continuous curve.

This effect is seen more readily by referring to FIGURE 9, which shows a comparison of the display made of a 90 Hz. curve with and without the use of the invention concepts, wherein FIGURE 9A shows the usual, somewhat indefinite curve presentation of prior art devices, which consists of a series of dots. However, in accordance with the invention, the curve of FIGURE 9B is formed of a succession of vertical sampled segments, not dots, whereby far better curve definition is presented by the display.

As previously noted, the x-axis function generator and deflection circuit 26, depicted in phantom line in FIGURE 3, may be defined by movement of the recording medium past the face of the CRT, or may be provided by a ramp generator circuit (FIGURE 12) which provides means for moving the electron beam of the CRT across the face of the tube in the x-axis direction. The timing pulses for moving the electron beam in the x-axis direction is provided via the switching input T_x introduced to the circuit 26 by means of the timing pulse generator source 24. T_x occurs for the duration of the seismic, multichannel record (approx. 5 to 10 seconds real time for most cases). During a recording T_y is the same as T_blank. T_y here would reset the integrator if one were actually added to the circuit rather than just using the inherent integrating effect of the various components, and at the same time it would advance the stairstep one step. It would perform both these functions each time δ.

Still referring to FIGURE 3, a simple modification to improve the operation of the embodiment of previous description consists of linearly modulating the ramp function provided by the movement of the recording medium past the CRT, or preferably, by modulating the ramp function provided by the x-axis function generator and deflection circuit 26. Accordingly, in this embodiment, the circuit is essentially the same as that of FIGURE 3, wherein however a sawtooth waveform generator is provided within the x-axis function generator and deflection circuit 26, to provide a sawtooth waveform which is summed with the ramp function utilized in the previous embodiment. Thus, as shown in FIGURE 10, a sawtooth waveform 42 is superimposed on a ramp function 44 wherein the time interval of each small ramp of the sawtooth waveform is equal to δ and the height or amplitude of each ramp thereof is equal to, $\epsilon = \Delta x - \zeta$ where Δx and ζ are the same as in FIGURES 1–2, 6–8. In accordance with the invention, the display normally written at x (FIGURE 8) will thus be written at x−ε or at $x-\Delta x+\zeta$ as shown in FIGURE 11. The ramp (which is actually an approximate ramp because of the movement of f(t) during δ) normally displayed in time ζ, will be displayed during the interval from $x-\Delta x+\zeta$ to $x+\zeta$. The advantage of this presentation is that for modest sample rates the input waveform can be sampled and reconstructed, and still be recognized since the gaps Δy and Δx, apparent in the prior art display of FIGURE 5, are both eliminated without the need for smearing the presentation. In essence, this embodiment of the invention provides that the value of the sample which is being held by the sample and hold circuit 14 is shifted back to the point $x-\Delta x+\zeta$, and then the curve is drawn to the succeeding sample value. Thus a sample segment 46 or 47 (FIGURE 11) is drawn which conform closely to the path of a curve 48, which represents the incoming seismic signal being received by that particular channel.

Referring now to FIGURE 5 there is shown another embodiment of the invention, utilizing a further sophistication of the principle employed in the two embodiments of previous description. The circuit of FIGURE 5 is essentially the same as that of FIGURE 3, having input sources 12 coupled to sample and hold circuits 14, which are coupled to multiplexers 16. The latter are connected to a y-axis function generator and deflection circuit 20 via the multiplexer output buss 18. The circuit includes, in addition, a plurality of variable time modulation circuits 50 coupled to the outputs of the same input sources 12, wherein the circuits 50 are coupled in turn to respective multiplexers 52. The multiplexers 52 are connected at their outputs to a common multiplexer output buss 53, and from thence to the x-axis function generator and deflection circuit 26.

In addition to providing the sawtooth waveform superimposed upon the ramp function, the embodiment of FIGURE 5 provides means for sensing the slope of the incoming seismic signal at the successive sample points and for modifying the respective sample segments which are displayed accordingly. Thus, each segment of the display curve is given a slope which changes in accordance with the slope of the seismic signal samples, to thus more closely approximate the curvature of the incoming seismic signal waveform. Accordingly, it is not necessary that the waveform of FIGURE 10 be linear during time $\delta$. In fact, as in this latter embodiment, a closer approximation to $y=f(t)$ of FIGURE 1 is obtained if $x=f(t)$ is of decreasing slope for positive second derivatives of $f(t)$, of increasing slope for negative second derivatives of $f(t)$, and linear where $f(t)$ has zero second derivatives. The degree and direction of changing slope are controlled by the x-axis circuitry, as in FIGURE 3, with its inputs at $t$ and $t-\Delta t$. Thus, the variable time modulation circuits 50 sense the slope of the incoming seismic signals in respective channels and provide an output which controls the slope of the sawtooth waveform which is superimposed on the ramp function generated within the x-axis function generator and deflection circuit 26.

FIGURE 12 illustrates by way of example only, various circuits which may be employed to provide the features of a ram function in combination with a sawtooth waveform, and thus a variable time modulation effect. Accordingly, with reference to one channel of the multichannel circuit, a slope sensing circuit 54 is coupled at its output to a slope changing circuit 55, which in turn is coupled to the multiplexer 52 of that channel. The multiplexer 52 output is summed to the output of a sawtooth waveform generator 56 via the output buss 53, and a buffer 65, whereby the output therefrom is in turn summed to the output of a ramp generator 57 by means of a summing network 58 via a buffer 67. Thus, the slope of the incoming seismic signal in each channel is sensed, and a signal commensurate therewith is provided, by the variable time modulation circuit 50, wherein the output of each channel thereof is sequentially connected to the sawtooth generator 56 via the multiplexers 52. As shown each output of the multiplexers 52 is coupled to the generator 56 output via the output buss 53. The output of the circuit 50 tends to increase or decrease the slope of the sawtooth waveform during each sample time, thereby providing curved sample segments 60, 62 as shown in FIGURE 13. The output from the summing network 58 is inverted, and thus an inverter circuit (not shown) may be coupled to the circuit 58, or the leads from the x-axis deflection amplifier to the deflection circuit may be switched to provide a signal of proper polarity. It may be seen that the segments 60, 62 approach very closely the natural curve of the incoming seismic signal represented by curve 64 thereby providing essentially an exact reproduction of the seismic signal.

Regarding the circuit of FIGURE 12 in greater detail, the circuits 54, 55 define the variable time modulation circuit 50, and circuits 56, 57, 58, 65 and 67 define in general the x-axis function generator and deflector circuit 26. The slope sensing circuit 54 includes a pair of serially connected "operational amplifiers" 68, 70 of conventional design, which consists of several stages of amplification but are commonly represented as shown. The amplifiers 68, 70 are combined with respective series capacitors 72, 74 and feedback resistors 76, 78 to provide a differentiation circuit which performs the slope sensing function. That is, two of the operational amplifiers in series provide an output equal to the second derivative of the input signal thereto. The capacitors 80, 82 shown in phantom across the resistors 76, 78 respectively, do not contribute to the differentiation but are generally desired to stabilize the circuit operation.

The slope changing circuit 55 is a voltage to current converter, and includes a pair of transistors 84, 86 coupled at their base electrodes to a voltage divider 88, which in turn is coupled between positive and negative voltage sources. The emitter electrodes of transistors 84, 86 are coupled to positive and negative voltage sources via resistors 90, 92 respectively. The collector electrodes are coupled together and provide therefrom the output signal of the circuit 55.

In operation, when the input to the slope changing circuit 55 is zero volts (i.e., linear slope) the current from transistor 84 will balance that required by transistor 86, and no current will flow from the output thereof, through multiplexer 52. If the input is positive (i.e., decreasing slope), more current is required by transistor 86 than is provided by transistor 84, and current will flow through the multiplexer 52 from the sawtooth waveform generator 56 to the slope changing circuit 55. This slows the charging of a capacitor 94 in the generator 56 to provide an output signal of decreased slope. If the input to the circuit 55 is negative (i.e., of increasing slope) more current is driven by transistor 84 than can be sinked by transistor 86. Thus current flows through the multiplexer 52 from the slope changing circuit 55 to the sawtooth waveform generator 56. This speeds the charging of the capacitor 94 in the generator 56 to provide an output signal therefrom of increased slope.

The sawtooth waveform generator 56 is a conventional form of sawtooth generator, and includes a pair of transistors 96, 98 with the collectors thereof coupled together via a resistor 100. The junction of the collector of transistor 96 and the resistor 100 is coupled to the output of the circuit 55 via the multiplexer 52 of the respective channel and buss 53. The charging capacitor 94 of previous mention is coupled between the junction and ground. The emitters of the transistors 96, 98 are coupled to positive and negative voltage sources respectively with a resistor 101 coupled to the positive source. The base of the transistor 98 is coupled to a source of trigger pulses which repeat every sample time $\delta$, and the base of transistor 96 is coupled to a positive voltage source via a Zener diode 102, and also to ground via a resistor 104. The resistor 101, Zener diode 102, and transistor 96 define a constant current generator, which when charging the capacitor 94, produces a linear ramp signal. Resistor 104 is used to keep the Zener diode 102 in conduction. The transistor 98 and its associated resistors are used to reset the ramp periodically, i.e. every time $\delta$.

The ramp generator 57 is similar to the generator 56, except that the slope of the ramp produced by the former generator is less than that of the latter. This is accomplished either by increasing the value of a resistor 106 coupled between the positive voltage source and a transistor 108, or increasing the value of a capacitor 110, or by reducing the voltage applied to a Zener diode 112. The input pulse to a transistor 113 in circuit 57 has a pulse length of $t_x$ and provides for resetting of the ramp after each record.

The buffers 65 and 67 each include operational amplifiers, connected in non-inverting relation as shown, which buffer the respective incoming signals thereto. The inputs to the operational amplifiers have very high impedance, i.e., they appear as open circuits to the current generators coupled to them, and thus they do not themselves draw appreciable input current. Further, the outputs thereof have negligible resistance and do not thus add resistance to resistors 114 or 116, which would cause errors in the summation process. The resistors 114 and 116 are coupled from the outputs of the buffer circuits 65 and 67 respectively; the free ends being coupled together and from thence to form the summing network 58.

The voltage summing network 58 is a voltage summer, which includes an operational amplifier 118, a feedback resistor 120 disposed in parallel therewith and resistors 116 and 114. The voltage at the output of the summing network 58 is approximately:

$$E_{out} = -E_A \frac{\text{resistor } 120}{\text{resistor } 116} - E_B \frac{\text{resistor } 120}{\text{resistor } 114}$$

where $E_A$ and $E_B$ are the output voltages from the buffers 67 and 65 respectively. This is in contrast to the operations of the circuits 55 and 56 whose outputs are current summed at the capacitor 94 of circuit 56.

Although the invention has been described herein with respect to several embodiments, it is to be understood that various modications could be made thereto within the spirit of the invention. Thus it is not intended to limit the invention except as defined in the following claims.

We claim:

1. Improved display apparatus for plotting time-shared waveforms including means for providing the time-shared waveforms, a cathode ray tube having a scanning electron beam, x-axis and y-axis beam sweeping circuits, and a z-axis beam display circuit, the improvement comprising; means coupled to the means for providing for selectively sampling and holding successive samples taken along said waveforms at a selected sample period $\Delta t$; and means coupled between the means for sampling and holding and the cathode ray tube for introducing the successive samples to the cathode ray tube during a predetermined portion of said sample period $\Delta t$ to display the successive sample values and the associated successive segments therebetween, the amplitudes of the segments being proportional to the respective differences between successive sample values.

2. The display apparatus of claim 1 wherein said means for sampling and holding includes means for sampling the waveforms for a selected sample time $\delta$, for integrating the sample during the sample time, and for holding the sample for said selected sample period $\Delta t$; wherein the means for introducing delivers the sample to the y-axis beam sweeping circuit of the cathode ray tube at the selected sample period $\Delta t$.

3. The display apparatus of claim 2 further including multiplexer means coupled between said means for selectively sampling and holding and said means for introducing the sample to said y-axis beam sweeping circuit, the multiplexer means being operable at the selected sample period $\Delta t$.

4. The display apparatus of claim 3 including means for displacing the electron beam in the x-axis direction; and pulse source means for providing switching pulses of selected synchronism to said means for sampling and holding, to said multiplexer means, to said means for introducing, and to said z-axis beam display circuit; wherein the means for sampling and holding and the multiplexer means selectively respond to the pulse source means to operate the means for sampling and holding during a portion of the operating time of the multiplexer means; and said z-axis beam display circuit responds to the pulse source means to selectively unblank the cathode ray tube during the operation of the means for sampling and holding to thereby display the successive segments between respective samples during the predetermined portion of said sample period $\Delta t$.

5. The display apparatus of claim 4 wherein the means for displacing includes an x-axis function generator coupled to the x-axis beam sweeping circuit; and the means for introducing the sample to the y-axis beam sweeping circuit includes a y-axis function generator for providing signals to the y-axis beam sweeping circuit in accordance with the values of the samples taken.

6. The display apparatus of claim 5 wherein said x-axis function generator provides a ramp function.

7. The display apparatus of claim 6 further including means for modulating the ramp function with a modulating signal of relatively higher frequency, wherein the modulating signal has a cycle time substantially equal to the sample time $\delta$ and has a magnitude substantially equal to $\epsilon = \Delta x - \zeta$, where $\Delta x$ and $\zeta$ are the display displacement corresponding to the sample period $\Delta t$ and the sample time $\delta$ respectively.

8. The display apparatus of claim 6 further including means for modulating the ramp function with a sawtooth waveform; and means for sensing the slope of each sample and for modifying the slope of the corresponding portion of the sawtooth waveform to provide a succession of line segments on said cathode ray tube which have slopes which change in accordance with the slope of the corresponding sample.

9. The display apparatus of claim 8 wherein the means for sensing and modifying the slope includes a differentiation circuit for sensing the slope of each sample; a voltage-to-current converter for delivering a slope changing signal commensurate with the slope sensed by the differentiation circuit; and second multiplexer means to selectively couple the slope changing signal to the means for modulating the ramp function to modify the sawtooth accordingly.

References Cited

UNITED STATES PATENTS

| | | | |
|---|---|---|---|
| 2,623,196 | 12/1952 | Toulon | 315—26 |
| 2,858,475 | 10/1958 | Blake | 315—26 |
| 3,134,957 | 5/1964 | Foote et al. | 340—15.5 |
| 3,209,320 | 9/1965 | Earthman | 340—15.5 |
| 3,284,766 | 11/1966 | Sterry | 340—15.5 |
| 3,323,105 | 5/1967 | Charske | 340—15.5 |

RICHARD A. FARLEY, Primary Examiner

M. F. HUBLER, Assistant Examiner

U.S. Cl. X.R.

315—25, 26; 340—15.5